(No Model.)
J. A. GLEIXNER & P. SCHAFF.
SEED SOWER.
No. 496,515. Patented May 2, 1893.
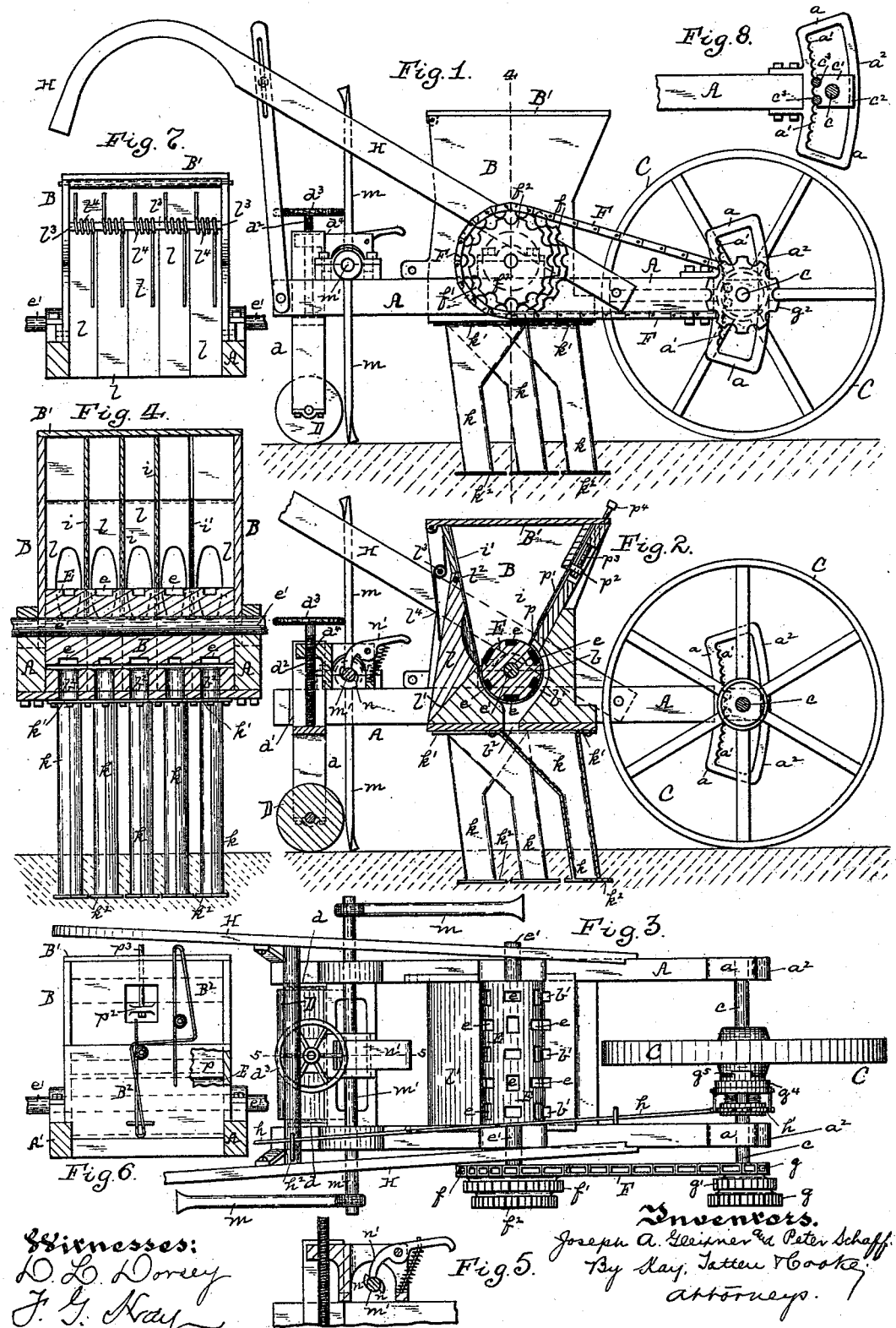

UNITED STATES PATENT OFFICE.

JOSEPH A. GLEIXNER, OF FAIR HAVEN, AND PETER SCHAFF, OF BALDWIN, PENNSYLVANIA.

SEED-SOWER.

SPECIFICATION forming part of Letters Patent No. 496,515, dated May 2, 1893.

Application filed July 28, 1892. Serial No. 441,482. (No model.)

*To all whom it may concern:*

Be it known that we, JOSEPH A. GLEIXNER, of Fair Haven, and PETER SCHAFF, of Baldwin township, in the county of Allegheny and State of Pennsylvania, have invented a new and useful Improvement in Seed-Sowers; and we do hereby declare the following to be a full, clear, and exact description thereof.

Our invention relates to seed sowers, being more especially adapted for use in the sowing of garden and like seeds by hand, though, of course, certain improvements may be employed for power operated sowers.

It has for its object to provide for the sowing of different rows of seeds of different kinds from the same hopper and close to each other, and the regulation of distances between the seed sown, the marking of the course of the sower so as to guide the operator in sowing the seed along the same line, and certain other improvements which will be hereinafter more particularly set forth.

The special points of invention desired to be covered will be hereinafter set forth and claimed.

To enable others skilled in the art to make and use our invention, we will describe the same referring to the accompanying drawings in which Figure 1 is a side view of our improved seed sower. Fig. 2 is a longitudinal section through the hopper. Fig. 3 is a top or plan view, the hopper being removed. Fig. 4 is a section on the line 4—4, Fig. 1 looking toward the rear. Fig. 5 is a detail section on the line 5—5, Fig. 3. Figs. 6 and 7 are end views of the hopper looking at the front and rear ends respectively, and Fig. 8 is a view of the segmental bearing.

Like letters of reference indicate like parts in each of the figures of the drawings.

The seed sower has the frame A on which the hopper B is supported, said hopper B having the lid B' which can be locked by the spring lock $B^2$, the frame having at the forward end the wheel C and at the rear end the roller D, while depending from the frame are the drills to which the seed is fed from the hopper and by which it is sown.

We will first describe the method of supporting the machine so as to regulate the depth of the drilling operation or to raise the drills out of the ground. For this purpose at the forward end of the frame A is the segmental bearing $a$ through which the shaft or axle $c$ passes, this segmental bearing being secured to the arm extending out or forming part of the frame by means of a suitable socket or connection, and having one of its faces $a'$ serrated or roughened so as to engage with the box $c'$ through which the axle $c$ passes, such box having lips $c^2$ extending along the opposite side of the outer rim $a^2$ of the segmental bearing so as to guide the movement of the box within the segmental bearing, while the box $c'$ has also seats $c^3$ in the inner face which travels opposite to the serrated face $a'$, and the box can be locked at any point along the segmental bearing by pins or like devices entering the depressions in the serrated face $a'$ and the seats $c^3$ of the box $c'$, so locking and holding the axle at any particular point vertically with relation to the body of the frame.

The segmental bearing $a$ is preferably made on or on a line from a radius from the shaft of the feeding roll within the hopper hereinafter referred to, but as the movement could not be large, and a chain connection is necessarily employed, the bearing may be simply a vertically slotted bearing to permit of the vertical adjustment between the frame and the driving wheel C.

For the adjustment of the machine at the opposite end, the roller D is mounted in a vertically moving frame $d$ which moves in the guide-ways $d'$ in the frame A and is adjusted vertically as desired by means of the screw bar $d^2$ which is turned by the hand wheel $d^3$ and passes through the threaded portion $d^4$ which forms part of the main frame, or is secured thereto. By these means the body of the frame may be adjusted vertically so as to cause the drills to enter the ground to any desired extent according as it is desired to sow the seed to any particular depth, or when the machine is being transported from place to place by the vertical adjustment of the driving wheel and the roller the drills can be lifted entirely out of the ground and supported so that they do not interfere with the movement of the sower. It will be noticed that the roller D is directly back of the seed drills. This roller is made of the full width of the furrows or course of the drills, and its purpose is to roll over the ground traversed by the drills and cover the seed and sufficiently compact the ground to insure the proper inclosing of the seed therein.

For the purpose of sowing the seed, we employ in the hopper B a pocket roll E, which roll has several rows of pockets $e$ extending around the same, the number of rows of pockets corresponding to the number of seed drills, being five in the machine illustrated, and the shaft $e'$ on said roll extends out at one side of the machine through the bearings formed therefor on the machine frame and carries the sprocket wheels $f\, f'\, f^2$ of different diameters, which sprocket wheels are connected by the sprocket chain F to the sprocket wheels $g\, g'\, g^2$ which may be operated in any suitable way so as to connect the driving wheel and sprocket and through the chain F drive the pocket roll in the hopper.

The clutch member $g^4$ is shown as operated by means of a lever $h$ which extends down from the upper end of the handles H and is connected by means of a link $h'$ to the clutch member $g^4$ so that by turning the lever $h$ the clutch can be operated either to connect or disconnect the shaft $c$ with the clutch $g^5$ on the driving wheel $c$ as may be desired. The lever $h$ may, of course, be locked at $h^2$ in the position desired so as to hold the wheel in or out of engagement. The pocket roll E fits snugly within the semi-circular seat $b$ forming the base of the hopper and on one side of said seat opposite to the pockets in the pocket roll are the grooves $b'$ which lead down to the discharge openings $b^2$ which communicate with the seed drills $k$, said seed drills being secured to a plate $k'$ adapted to be secured to the base of the machine and having inlets adapted to coincide with the outlet openings $b^2$ of the hopper, the seed being directed from these openings either vertically down through the drills or forward or back, as desired. The drills can, of course, be made of suitable metal, and have at the lower ends the plows $k^2$ to enable them properly to enter the ground.

In order to divide the hopper into a series of chambers corresponding with the number of rows of pockets in the pocket roll, and also to arrange so that the machine may feed the same seed through two or more of the rows of pockets, we provide the hopper with the removable partitions $i$ which enter longitudinal grooves or seats $i'$ formed for their reception, and so divide the hopper into a series of compartments corresponding to the number of rows of pockets in the pocket roll.

For the proper operation of the drill as it is necessary to provide for the quick discharge of the seed from any one of these compartments, we have arranged the spring operated shutter $l$, a series of such shutters corresponding to the number of compartments within the hopper being formed along the one side thereof so that in case it is desired to discharge the seed from the hopper or from any compartment thereof, such shutter may be raised and let the seed pass from the same over the inclined face $l'$ below which it may be received into any suitable receptacle.

The construction of the shutters is more clearly shown in the longitudinal section, Fig. 4, the shutters being mounted on the pin or bearing $l^2$ while the springs $l^4$ are mounted around the shaft $l^3$ and press on the rear or outer face of the shutters to hold them in contact with the wheel.

In order to prevent any seeds from passing down from the hopper, except those which have entered within the pockets of the pocket roll, we provide the flexible apron $p$ which bears upon the surface of the pocket roll and sweeps over the same in such way as to prevent any seed from passing from the hopper to the grooves $b'$. And in order to regulate the pressure of said flexible apron $p$, according to the size of the seed sown, so as to bear more or less firmly upon the pocket, we secure the apron $p$ in an apron carrier $p'$ and which is mounted on the inner face of the hopper and which has the nut $p^2$ extending outwardly therefrom, the nut engaging with a screw bar $p^3$ which is turned by a hand wheel $p^4$, by means of which the apron carrier may be raised and lowered.

In the operation of these seed sowers it is desirable to mark in some way the course of movement of the machine so that as the machine next passes along the course the operator can guide it parallel with the last course traveled, and for this purpose we employ the markers $m$ mounted on the shaft $m'$ on the frame A, which markers extend out somewhat beyond the machine and are adapted to scrape on the surface of the soil and so mark the course of the machine. The markers are rigidly secured to the shaft $m'$ and that shaft has a seat $n$ shown in the longitudinal section (Fig. 5), which engages with a spring pawl $n'$ so as to hold one of the markers in a downward position when in use, but upon freeing the spring pawl from the seat $n$, the shaft $m'$ with its markers may be turned up out of the way, as is shown in Fig. 3.

In the operation of the machine the seeds are fed to the hopper which may be divided into several compartments by removable partitions $i$, and in transporting the machine to the place where it is to be used, the wheel C may be adjusted in the segmental or slot bearings $a$ and the roller D may be lowered by the hand wheel $p^3$ so as to raise the drills $k$ above the ground and provide for the easy transportation of the sower.

The machine may be adjusted by means of different sizes of sprocket wheels so as to give the feeding pocket any desired movement with relation to the length of movement of the machine feeding the seeds at any distance apart, say, from one-half inch upward, this being accomplished by the adjustment of the sprocket chain upon any desired sprocket wheels, such as the wheels $f f' f^2$ and $g g' g^2$. In locking, however, according to the seed which is to be sown, the pocket roll may be changed, providing one with deep pockets, shallow pockets, pockets close or far from each other, as may be found desirable, this being easily accomplished by lifting the upper part of the hopper from the frame and inserting the roll and securing the hopper again in position.

By raising the roller D and the driving wheel C in their frame or bearing, the machine is adjusted to cause the drills to enter the ground to any desired distance, and as the machine is pushed forward by means of the handles H, when the operator desires to sow the seed he throws the clutch $g^4$ into engagement with the driving wheel C, in which case through the sprocket chain the pocket roll is turned and the seeds are carried by the pockets past the flexible apron $p$ and down through the feeding grooves $b'$ to the discharge openings $b^2$ of the hopper, the seed then entering into the seed drills and passing through the same into the ground, and as the roller D passes over the same course as the seed drills, it will press the earth together sufficiently to properly cover the seed. During the movement of the machine, one of the scrapers is turned downwardly and acts to scrape or mark the course of the machine, so that in again passing along the machine will be guided in its movements.

In case it is desired to empty any particular compartment of the hopper, such as where it is desired to change the seed quickly, this can be easily done by raising the particular shutter $l$ and permitting the seed to pass from such compartment, which can again be filled with other seeds. In the same way the number of rows that may be sown by the machine may be varied, such, for example, as where only every other compartment is filled with seed, the space between the rows being thus varied. The machine thus gives opportunity for the sowing of any of the smaller seeds according to the desired depth to which they are to be sown, a variation in distance at which the seeds are sown and the spaces between the furrows, while at the same time the seeds are properly covered after the sowing operation.

What we claim as our invention, and desire to secure by Letters Patent, is—

1. In seed sowers, the combination of a frame having a series of drills and having slotted or segmental bearings at the forward end, and a driving wheel having boxes moving in said bearings, and locking means for holding the same, substantially as and for the purposes set forth.

2. In seed sowers, the combination of a frame having a series of drills and having slotted or segmental bearings at the forward end, said bearings having one face thereof serrated or roughened, and a driving wheel mounted in the boxes within said slotted bearings, and keys engaging with the boxes and such serrated faces, substantially as and for the purposes set forth.

3. In seed sowers, the combination of a frame carrying the drills, and a shaft mounted in said frame carrying marker arms, said shaft having a seat thereon and a spring pawl engaging with said seat, substantially as and for the purposes set forth.

4. In seed sowers, the combination of a frame having a hopper and seed drills below the same, of a roll having a series of rows of pockets therein, said hopper having spring operated discharge shutters corresponding to the number of rows of pockets in the roll, substantially as and for the purposes set forth.

5. In seed sowers, the combination of a frame having a hopper and seed drills below the same, of a roll (said pockets opening above the roll) having a series of rows of pockets therein, said hopper having spring operated discharge shutters corresponding to the number of rows of pockets in the roll, and partitions in said hopper to divide the same into a series of compartments, substantially as and for the purposes set forth.

6. In seed sowers, the combination of a frame, a hopper having a measuring roll provided with a series of pockets mounted therein, a series of drills below the hopper, and a flexible apron within the hopper adapted to press upon the measuring roll, said apron being secured to a vertically adjustable apron carrier, substantially as and for the purposes set forth.

In testimony whereof we, the said JOSEPH A. GLEIXNER and PETER SCHAFF, have hereunto set our hands.

JOSEPH A. GLEIXNER.
PETER SCHAFF.

Witnesses:
J. N. COOKE,
D. L. DORSEY.